(12) United States Patent
Donaldson

(10) Patent No.: US 6,301,407 B1
(45) Date of Patent: Oct. 9, 2001

(54) DIELECTRIC OPTICAL FILTER NETWORK

(75) Inventor: Alan Donaldson, Paignton (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/304,438

(22) Filed: May 3, 1999

(30) Foreign Application Priority Data

Dec. 22, 1998 (GB) .................................... 9828330

(51) Int. Cl.[7] ..................................... G02B 6/32
(52) U.S. Cl. .................. 385/34; 385/16; 385/24; 359/124; 359/127; 359/131
(58) Field of Search .................. 385/34, 16, 24; 359/124, 127, 131

(56) References Cited

U.S. PATENT DOCUMENTS

| | | | |
|---|---|---|---|
| 4,244,045 | * 1/1981 | Nosu et al. ........................ | 359/124 |
| 4,991,924 | * 2/1991 | Shankar et al. ...................... | 385/34 |
| 5,583,683 | * 12/1996 | Scobey ................................ | 359/127 |
| 5,859,717 | * 1/1999 | Scobey et al. ...................... | 359/124 |
| 6,075,632 | * 6/2000 | Braun ................................. | 359/124 |

OTHER PUBLICATIONS

Fiber Optics Handbook (F C Allard Ed.) Selected pages including Figure 3.80 and related text. No Date Available.

* cited by examiner

*Primary Examiner*—Ellen E. Kim
(74) *Attorney, Agent, or Firm*—Lee, Mann, Smith, McWilliams, Sweeney & Ohlson

(57) ABSTRACT

A design of expanded-beam type wavelength multiplexer or channel drop and insert filter using oblique light incidence upon a concatenation of substrate mounted dielectric filters involves mounting the beam-expanding graded-index lenses in pre-aligned V-grooves, and only later securing fibers to those lenses. This approach simplifies component alignment problems by reducing the number of degrees of freedom and, by virtue of the fact that the mechanical design allows implementation using minimal amounts of adhesive, provides long-term stability of optical performance.

16 Claims, 5 Drawing Sheets

DIELECTRIC OPTICAL FILTER NETWORK

BACKGROUND OF THE INVENTION

Multilayer dielectric filter optical interference filters have been known for many years. Developments in their technology have recently made it possible, by the use of high energy deposition processes such as sputtering or ion-assisted deposition, to produce high quality stable narrow-passband optical interference filters with centre wavelengths that exhibit negligible sensitivity to humidity. Moreover, if the dielectric layers that go to make up the filter are deposited on a substrate having the appropriate temperature expansion coefficient, a temperature coefficient of centre wavelength shift of the filter can also be made by very small, typically less than 2 pm/° C. The construction of a wavelength division demultiplexer using a set of such filters, each with a different centre wavelength, is for instance described in 'Fiber Optics Handbook for Engineers and Scientists,' Editor F C Allard published by McGraw-Hill. In chapter 3 of this book P Morra & E Vezzoni describe, with particular reference to its Figure 3.80, a demultiplexer in which a set of dielectric interference filters are mounted, regularly spaced, in two lines on opposed faces of a glass block. An input fibre with a collimating graded-index lens termination directs light through the block to be incident obliquely upon the first filter at the appropriate angle to ensure that light, of a wavelength reflected by all the filters of the set, is reflected so as to be similarly obliquely incident in turn upon each of the other filters of the set. Associated with each filter is an output fibre with a similar collimating graded-index lens termination mounted so that its lens termination receives the transmitted component of the light obliquely incident upon that filter. Each of the collimating graded-index lens terminations is shown as being located in appropriate orientation with respect to the glass block and its filters by means of an associated wedge-shaped spacer.

In principle the structure is quite simple and elegant; in practice there are considerable difficulties in implementing such a structure with satisfactory manufacturing yield and with an acceptable degree of precision and long-term stability to suit dense wavelength division multiplexing (DWDM) applications. In this respect it is to be noted that, since all the filters are mounted in nominally fixed orientation with respect to each other, while there may be limited scope for altering the angle of incident upon the first filter of the set for the purpose of fine-tuning to centre wavelength, no corresponding facility is then possible for further fine-tuning the centre wavelengths of any of the succeeding filters of the set. Then there is the additional problem that individual filters are subject to alignment errors as the result of the trapping of dust particles and the like between the filters and the glass block. A simulation of the effects of such particles upon filters considered to be perfectly prepared at the correct centre wavelength spacing and then bonded on to the block indicated that particles of only 2 $\mu$m diameter are liable to introduce errors in channel position exceeding a 100pm tolerance threshold. These alignment problems can be circumvented by separately bonding free-standing filters by their side edges to a common substrate. Each such filter then has three translational and three rotational degrees of freedom. Then the positioning of the end of each of the collimating graded-index lens terminated fibre on the substrate relative to its associated filter involves a further three translational and three rotational degrees of freedom. A certain number of these degrees of freedom are of little or no practical consequence, examples being the translational movement of a lens terminated fibre along its axis, and rotation of the fibre or its associated filter about that axis. There remain however a large number of degrees of freedom for which such scale movement can have a significant effect upon the optical operation of the device.

SUMMARY OF THE INVENTION

An object of the invention is to provide an assembly method in which the necessary degrees of freedom for the satisfactory alignment of its components can be achieved in a manner that does not involve having movement-sensitive components bonded by thicknesses of adhesive large enough to give rise to temperature and long-term instability effects of unacceptably large magnitudes.

In this context it has been found that, when using fibres with pre-assembled collimating graded-index lens terminations, generally the optimum alignment of such terminated fibres with dielectric interference filters secured by their side edges to a planar surface of a substrate does not result in the physical axes of the terminations of the individual fibres lying in a common place. Accordingly these terminations can not be secured in direct line contact with the same or some other planar surface of the substrate, but have to be secured in some manner that allows individual terminations to be inclined at different angles to such a surface.

In the method of assembly according to the present invention these problems are avoided by arranging to delay the securing of each fibre to its associated graded-index lens termination until after that termination has been mounted. In this manner optimum alignment of the fibres, their terminations, and the dielectric interference filters can be achieved with all the terminations in line contact with a supporting substrate, preferably with each termination secured in line contact with both surfaces of an associated V-groove formed in the substrate surface.

Other features and advantages of the invention will be readily apparent from the following description of preferred embodiments of the invention, the drawings and the claims.

BRIEF DESCRIPTION OF THE DRAWINGS

In FIG. 1 there is depicted a 4-way wavelength demultiplexer multiplexer/demultiplexer having six ports constituted by six optical fibres 10 to 15. When the device is employed as a demultiplexer, fibre 10 is the input fibre, fibres 11 to 14 are output fibres respectively for channel separated outputs in wavebands $\lambda_1$ to $\lambda_4$. This output fibre 15 may be connected to an input fibre of a further demultiplexer for demultiplexing further channels. When the device is employed as a multiplexer, signals within the four wavebands $\lambda_1$ to $\lambda_4$ are applied respectively to fibres 11 to 14 so as to provide a multiplexed output on fibre 10, and if there is a further signal to be multiplexed with channels $\lambda_1$ to $\lambda_4$ (this further signal, which may itself be a wavelength multiplexed signal, having no signal components within channels $\lambda_1$ to $\lambda_4$), then this further signal is applied to the device by way of fibre 15.

Figure 1:
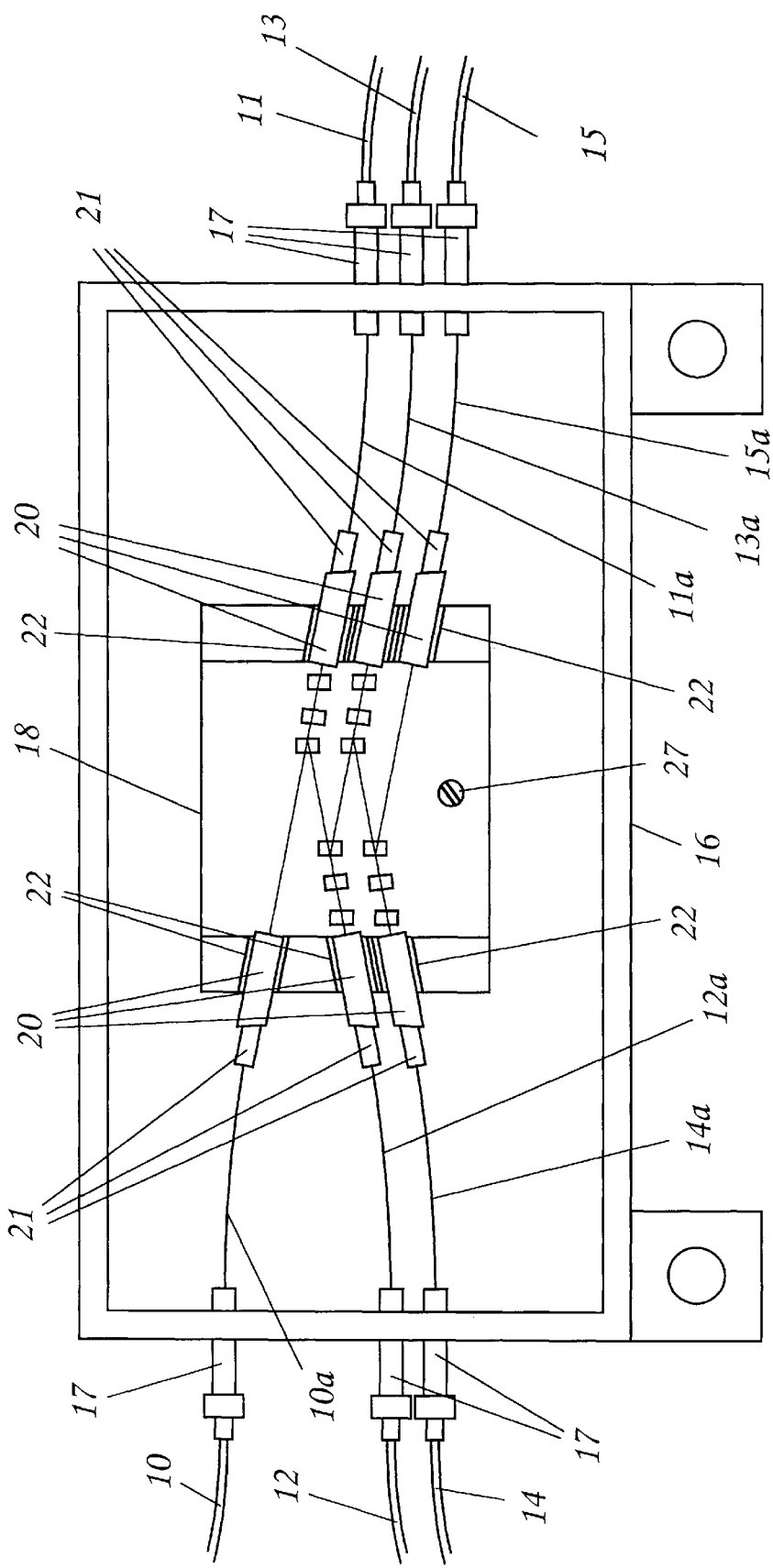
FIG. 1 is a schematic diagram of a multiplexer/demultiplexer embodiment of the present invention.

The six fibres 10 to 15 extend into a hermetic package 16 by way of hermetic feed-throughs 17, and to the floor of the package 16 is secured a low expansion coefficient substrate 18. A preferred construction of hermetic feed-through 17 has a low expansion nickel iron cobalt alloy tube which is slipped over the bared end of the fibre, and then has one end hermetically sealed to the bare fibre with a glass solder. The tube is dimensioned so that it is able to pass freely through a co-operating collar sealed in the side-wall of the enclosure 16, and the feed-through is rendered hermetic by soldering the tube to the collar when that collar is threaded by the tube.

Within the package 16, each of fibres 10 to 15 extends as bare fibre 10a to 15a to terminate in an associated collimating graded-index lens 20, being secured to its lens 20 by means of adhesive between the lens and a ferrule 21 secured around the end of that fibre. Typically, the ferrules 21 are made of zirconia or glass. The lenses 20 are secured in alignment V-grooves 22 formed in the substrate 18. Each bare fibre 10a to 15a is arranged to extend in an arcuate path between its ferrule 21 and its feed-through 17 so that any small relative movement between ferrule and feed-through occurring after assembly does not strain the fibres to an unacceptable extent.

The alignment V-grooves 22 of the substrate 18 for receiving the collimating lenses 20 of the fibres 10, 12 and 14 lie near one edge of the substrate, while those of the fibres 11, 13 and 15 lie near the opposite edge. Between these two groups of three V-grooves, the substrate has a platform 23 upon which are mounted four primary dielectric interference filters $24_1$ to $24_4$, four secondary ones $25_1$ to $25_4$, and four substantially transparent dielectric steering blocks $26_1$ to $26_4$. These are depicted on a larger scale in FIG. 2 in which they are separately identified. Primary filters $24_1$ to $24_4$ are narrow pass-band filters with pass-bands registering respectively with channel wavebands $\lambda_1$ to $\lambda_4$. Secondary filters $25_1$ to $25_4$ typically have the same passband characteristics as their primary filter counterparts $24_1$ to $24_4$, and are present in the demultiplexer device in order to provide enhanced cross-channel rejection in comparison with that obtained using only the primary filters $24_1$ to $24_4$ for channel separation. In a multiplexer device cross-channel rejection is not usually a problem, and so, in a multiplexer, these secondary filters can generally be safely omitted. Even in a demultiplexer device the use of the secondary filters $25_1$ to $25_4$ will not always be necessary if the primary filters $24_1$ to $24_4$ are of good enough quality. Moreover, when secondary filters $25_1$ to $25_4$ are required, they may not need to be of as high a quality as is required for the primary filters $24_1$ to $24_4$. The dielectric steering blocks $26_1$ to $26_4$ are not optical filter elements: their function, which will be explained later in greater detail, is to provide a small offset to the collimated beams of light transmitted obliquely through them, the magnitude and direction of these offsets being determined by the respective orientations of these steering blocks.

The respective orientations of the primary and secondary filters and of the steering blocks are such as to satisfy a number of criteria. One criterion is that light that lies outside the bounds of the wavebands $\lambda_1$ to $\lambda_4$, and that is launched into the device by way of fibre 10 to emerge as a collimated beam from its associated lens 20, shall be obliquely incident upon, and reflected by, each of the primary filters $24_1$ to $24_4$ in turn so as finally to be incident upon the lens 20 of fibre 15 with a position and orientation providing efficient coupling of that incident light into fibre 15. Another criterion is that the angles of incidence upon the primary filters should be small enough not to engender excessive polarisation sensitivity. Competing criteria include the requirements that the angles of incidence shall not only be large enough to provide clearance between adjacent pairs of lenses 20 of fibres 10, 12 and 4, and also between those of fibres 11, 13 and 15, without introducing excessive optical loss as the result of having too long a collimated beam path length, but also that they be large enough to provide a sufficient centre-wavelength tuning range. In respect of graded-index lenses having an external diameter in the region of 2 mm an angle of incidence in the region of 6° to 8° is typically a satisfactory compromise between these completing requirements. Within this range, the orientation of each specific primary filter $24_1$ to $24_4$ is then selected to provide the particular angle of incidence which registers its pass-band upon the desired channel waveband $\lambda_1$ to $\lambda_4$. The orientation of the corresponding secondary filter $25_1$ to $25_4$, if present, is selected similarly to provide its particular angle of incidence which registers its pass-band upon the desired channel. A secondary consideration concerning this alignment of the secondary filter is to choose an orientation that directs light that is reflected by this filter, which is unwanted light, away from any direction in which it can contaminate light that is wanted. The choice of an angle below the 6° to 8° range may be preferred in order to minimise polarisation sensitivity. Finally, the orientation of the corresponding steering block $26_1$ to $26_4$ is chosen to optimise the coupling of light into fibres 11 to 14 that has been transmitted through the corresponding primary and secondary filters $24_1$ to $24_4$ and $25_1$ to $25_4$.

The method of assembly of the components of FIG. 1 commences with the securing of the six graded-index lens terminations 20 to the substrate 18 in their respective V-grooves 22, and follows this with the securing of the substrate 18, which is typically made of a low expansion co-efficient nickel iron cobalt alloy, in the base of the package 16. This may, for instance, be by means of a bolt 27. In order that back reflections at the ends of the lens terminations 20 do not cause problems, the two end facets of each lens termination 20 do not extend in parallel planes. The end that is to face inward toward the primary filters is an anti-reflection coated facet that lies in a plane whose normal extends in the axial direction of the lens. At the opposite end, the end facet lies in a plane whose normal extends at an angle to the axial direction of the lens. Each lens 20 has a small flat (not shown) ground on its inclined facet end, by which facet the orientation of that lens can be visually determined. By this means each lens is oriented so that its offset angle lies in a plane parallel with that of the substrate platform 23, and while held in this orientation in line contact with the surfaces of the V-grooves, all the lenses 20 are secured in position with adhesive, which is fully cured before proceeding any further with the assembly process. The ends of the ferrule terminated fibres have inclined end facets to match. When each of the fibres 10 to 16 is abutted, by means of its ferrule 21, in its correct position with respect to its associated lens termination 20, it is abutted with its axis laterally displaced with respect to the lens axis so that light directed from that fibre into the lens emerges from its far end as a collimated beam emerging at a small angle, typically 2°, to the lens axis.

After the adhesive securing the lens terminations 20 in their V-grooves has been fully cured, and the substrate 18 has been secured in the base of the package 18, the fibres 10 and 11 are threaded through the side walls of package 16 via their respective feed-throughs 17. Then, before the placement of any of the filters 24 and 25 and of any of the steering blocks 26, the preferred assembly method involves exploring the ferrules 21 of fibres 10 and 11 in three dimensions over the ends of their respective graded-index lenses 20 in order to find the position of maximum coupling of light from fibre 10 into fibre 11. When the position is found, the ends of these two fibres are held in this position while adhesive is applied between their ferrules and graded-index lenses, and is cured. At this time the feed-throughs 17 of these two fibres 10 and 11 are soldered to make them hermetic feed-throughs. The assembly is then ready for the placement of primary filter $24_1$.

Primary filter $24_1$ is placed in approximately the correct position on the platform 23 of substrate 18 with the aid of a micro-manipulator (not shown), and either the ferrule terminated fibre 12, or a receiving fibre (not shown) that is terminated with a ferrule in the same manner as fibre 12, but which does not have any corresponding tube for the making of a hermetic feed-through 17, is inserted through the side wall of enclosure 16. The filter $24_1$, which in this example is oriented so that the dielectric interference layers are on the face of the filter remote from the incident light, is rotated about an axis perpendicular to the plane of the platform 23 to bring its transmission waveband into registry with the channel waveband $\lambda_1$. (The alternative orientation, orientation with the dielectric interference layers are on the face of the filter facing the incident light, is a viable alternative orientation). The filter $24_1$ is also tilted about an axis lying in a plane a parallel to the plane of the platform 23 so as to adjust the height of the position at which the reflected beam is incident upon lens 20 of fibre 12. Additionally it is translated in a direction generally towards or away from lens 20 of fibre 12 so as to adjust the lateral position of the reflected beam as it strikes that lens. These movements are coordinated with movement, by its ferrule, of fibre 12 (or as the case may be, the receiving fibre) over the surface of lens 20 in order to optimise the coupling of light reflected by filter $24_1$ into that fibre, while at the same time optimising the registration of its transmission waveband with the channel waveband $\lambda_1$. When the required position for filter $24_1$ has been determined, it is removed in a controlled manner from proximity with the surface of platform 23, adhesive is applied, and then it is replaced as precisely as possible in its former position, and then the adhesive is cured. If the receiving fibre has been employed in the alignment process in place of fibre 12, then this receiving fibre is removed the from the package prior to the curing of the adhesive securing filter $24_1$. If the receiving fibre has not been employed in the alignment process in place of fibre 12, then the fibre 12 and its ferrule 21 may be secured to its associated graded-index lens 20 with adhesive that may be cured at the same time as the curing of the adhesive securing the filter $24_1$. Thereafter, the fibre's feed-through 17 is soldered to make it hermetic.

The reason for using, upon occasion, the receiving fibre while aligning filter $24_1$, rather than fibre 12 itself, is that the curing of the adhesive is liable to introduce small misalignment of the filter. This misalignment will generally be too small to have any significant effect upon the transmission wavelength of the filter, but in certain circumstances it can sometimes be large enough to have a significant effect upon coupling efficiency into a fibre secured in position on the lens 20 receiving the light reflected by filter primary $24_1$.

The positioning of the secondary filter $25_1$ is a more simple process than the positioning of the primary filter $24_1$. This is because the direction in which secondary filter reflects light is not so critical. All that is required is that this reflected light is directed away from where it can cause problems. Once this secondary filter has been secured in position so that its transmission waveband similarly registers with the channel waveband $\lambda_1$, the steering block is oriented so as to compensate for the lateral displacement of the transmitted beam effected by its oblique transmission through the primary and secondary filters.

If the receiving fibre has been employed in place of fibre 12, then at some stage after the curing of the adhesive securing the primary filter $24_1$, either before or after the curing of the adhesive securing the secondary filter $25_1$ and the steering block $26_1$, the fibre 12 is inserted into the package to occupy the position formerly taken by the receiving fibre. The position of the ferrule 21 of fibre 12 on the surface of the associated lens 20 is optimised before securing the ferrule with adhesive to that lens, and then the fibre's feed-through 17 is soldered to make it hermetic.

The cycle of operations for the positioning and securing of the primary and secondary filters $24_2$ and $25_2$ the steering block $26_2$ and the fibre 13, is a repeat of the operations described above in relation to the positioning and securing of the primary and secondary filters $24_1$ and $25_1$, the steering block $26_1$ and the fibre 12, with the difference that, if the receiving fibre is employed, it is in this instance temporarily inserted into the package 16 to take the position later to be occupied by fibre 13, and also with the difference that the alignment of the primary and secondary filters $24_2$ and $25_2$ is such as to align their transmission wavebands with the channel waveband $\lambda_2$.

The cycle of operations is then repeated a further two times for the positioning and alignment of the remaining primary and secondary filters $24_3$, $24_4$, $25_3$ and $25_4$, the remaining steering blocks $26_3$ and $26_4$, and the remaining fibres 14 and 15. Finally a lid (not shown) is secured to the top of the package to form it into a hermetic enclosure.

The specific multiplexer/demultiplexer described above and illustrated in FIGS. 1 and 2 is a 4-way multiplexer/demultiplexer device with an additional port provided to afford a remultiplexing/demultiplexing extension facility. It should be appreciated that the geometry is applicable generally to n-way multiplexer/demultiplexers where n is not necessary equal to 4, and that the provision of the extension facility is not essential.

Figure 2:
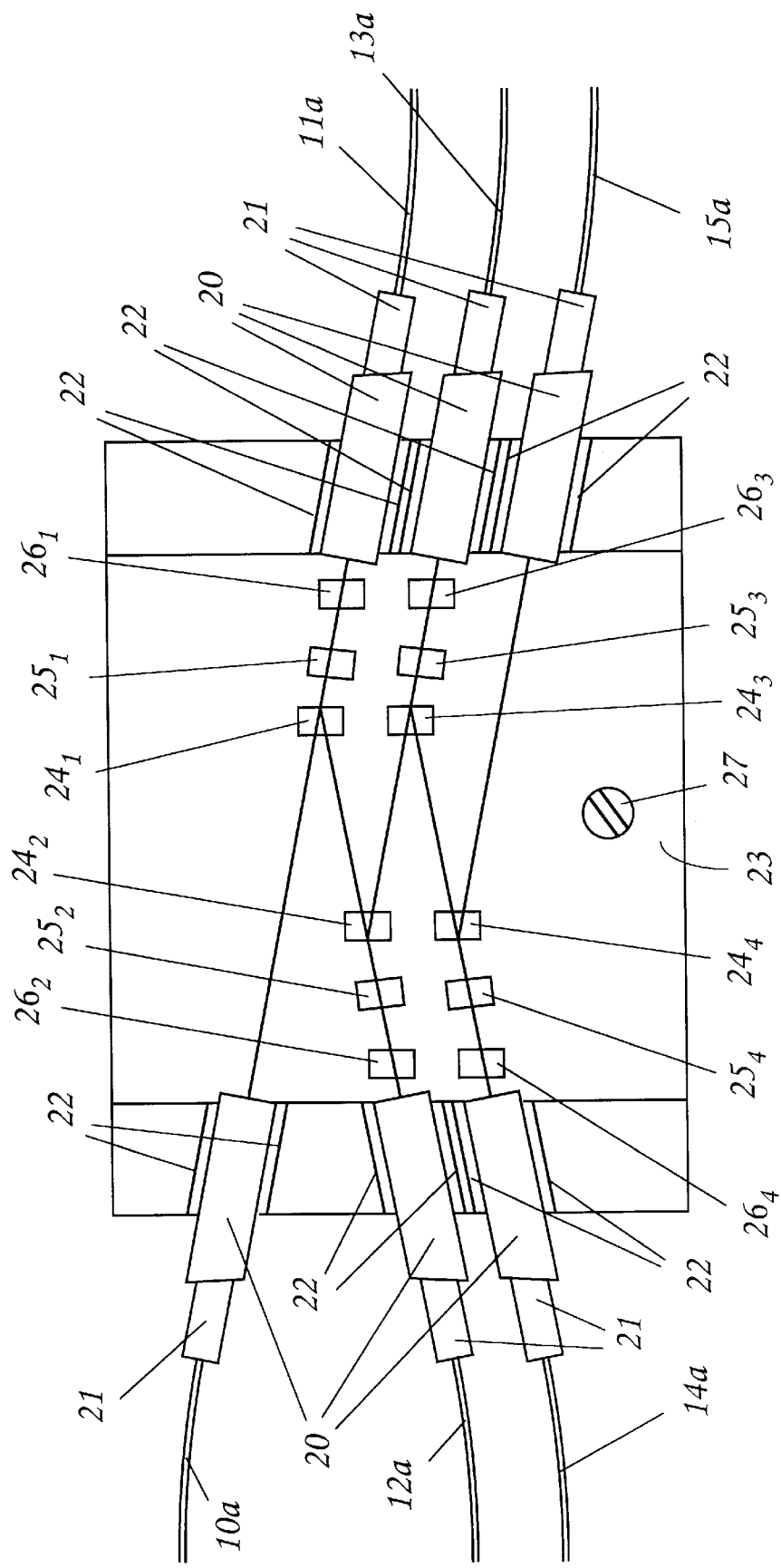
FIG. 2 depicts in greater detail the central portion of the multiplexer/demultiplexer of FIG. 1.
Figure 3:
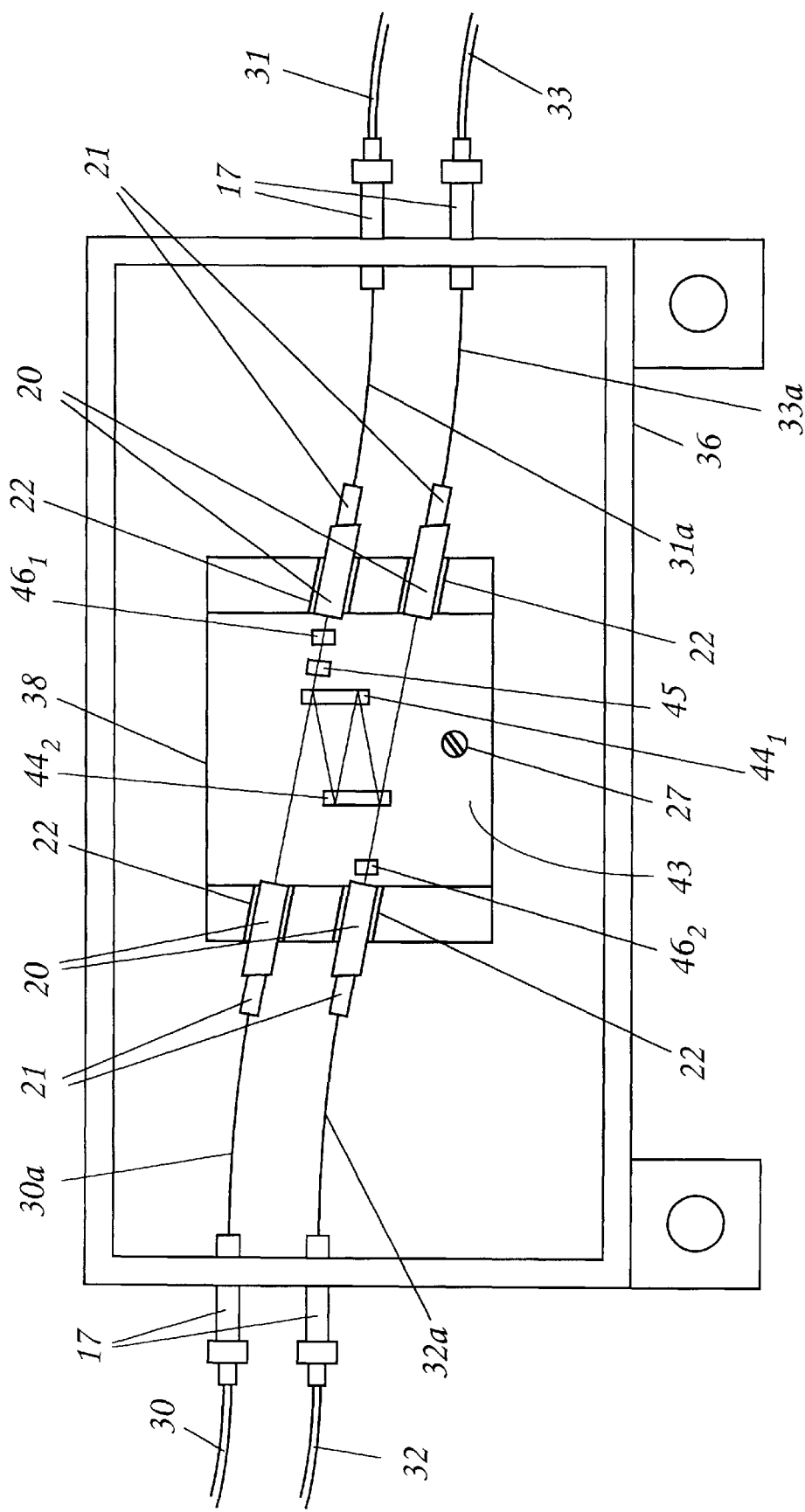
FIG. 3 is a schematic diagram of a channel drop and insertion filter embodiment of the present invention.

Attention is now turned to the optical channel drop and insertion network device which is depicted in FIG. 3, and which possesses many features in common with multiplexer/demultiplexer device of FIGS. 1 and 2. This is a device having four ports constituted by four optical fibres 30 to 33. Fibre 30 is an input fibre which is capable of propagating wavelength multiplexed signals in wavelength bands that include the channel waveband $\lambda_m$. Fibre 31 is an output fibre for the dropped channel in waveband $\lambda_m$. Fibre 32 is an input fibre for the inserted channel in waveband $\lambda_m$, and fibre 33 is the output fibre which is capable of propagating the wavelength multiplexed signals in wavelength bands that include the channel waveband $\lambda_m$. The four fibres 30 to 33 extend into a hermetic package 36 (similar to package 16 of FIG. 1) by way of hermetic feed-throughs 17, and to the floor of this package 36 is secured a low expansion coefficient substrate 38 (similar to substrate 18 of FIGS. 1 and 2).

Within the package 36, each of the fibres 30 to 33 extends as bare fibre 30a to 33a to terminate in an associated collimating graded-index lens 20, being secured to that lens by means of adhesive between the lens and a ferrule 21 secured around the end of that fibre. The lenses are secured in alignment in V-grooves 22 formed in the substrate 38. Each bare fibre 30a to 33a is arranged to extend in an arcuate path between its ferrule 21 and its feed-through 17 so that any small relative movement between ferrule and feed-through occurring after assembly does not strain the fibre to an unacceptable amount.

The alignment V-grooves 22 of the substrate 38 for receiving the collimating lenses 20 of fibres 30 and 32 lie near one edge of the substrate, while those of fibres 31 and 33 lie near the opposite edge. Between these two groups of V-grooves, the substrate has a platform 43 (similar to platform 23 of FIGS. 1 and 2) upon which are mounted two primary dielectric interference filters $44_1$ and $44_2$, a secondary dielectric interference filter 45 and two substantially transparent dielectric steering blocks $46_1$ and $46_2$. The filters $44_1$, $44_2$ and 45 are all narrow pass-band filters, each with its pass-band registering with waveband channel $\lambda_m$. The primary filters are positioned so that light, of wavelengths outside the bounds of channel waveband $\lambda_m$, that is launched efficiently into fibre 30 is reflected alternately twice in filter $44_1$, and twice in filter $44_2$, before being launched into fibre 33. The secondary filter 45 is oriented so that its pass band registers with channel waveband $\lambda_m$ so as to provide enhanced discrimination preventing power in other wavebands from coupling from fibre 30 into fibre 31. Then the orientation of steering block $46_1$ is chosen to optimise the coupling of light within channel waveband $\lambda_m$ from fibre 30 into fibre 31. Similarly, the steering block $46_2$ is oriented so that light within the channel waveband $\lambda_m$ that is launched into fibre 32 is, from there, launched efficiently into fibre 33 after having been transmitted in turn through the steering block $46_2$ and the primary filter $44_2$.

When the light from fibre 30 is first incident upon primary filter $44_1$, most of the power in channel waveband $\lambda_m$ is transmitted, but a small proportion is reflected. This reflected $\lambda_m$ power has the potential for appearing as cross talk upon the $\lambda_m$ power inserted into fibre 33 from fibre 32. If there were but a single reflection in each of the primary filters $44_1$ and $44_2$, then the $\lambda_m$ power reflected by filter $44_1$ would be further attenuated by the single reflection in filter $44_2$ before being launched into fibre 33. However, because there is a double reflection in each of the primary filters $44_1$ and $44_2$, the $\lambda_m$ power reflected by filter $44_1$ in the first instance is further attenuated three times over, instead of just the once, before being launched into fibre 33.

It was explained above that, in respect of the particular example of the multiplexer/demultiplexer of FIGS. 1 and 2, the angle of incidence of the light incident upon the primary filters $24_1$ to $24_4$ was chosen to be in the region of 6° to 8° so as to minimise polarisation dependent effects in a manner consistent with avoiding having an excessive optical path length of collimated beams from the lens 20 of fibre 10 to that of fibre 15, while still leaving enough room to accommodate the side-by-side arrangement of the lenses 20 of fibres 11, 13 and 15. Similar considerations, in respect of the channel drop and insertion device of FIG. 3, allows these criteria to be met with the angle of incidence reduced to about 4° as the result of the fact that no lens 20 is required to accept either the light from fibre 30 transmitted through filter $44_2$ after the first reflection in filter $44_1$, or that transmitted through filter $44_1$ after its first reflection in filter $44_2$.

The method of assembly of the components of FIG. 3 commences with the securing of the four graded-index lenses 20 to the substrate 38 in their respective V-grooves 22, and follows this with the securing of the substrate 38, which is typically made of a low expansion co-efficient nickel iron cobalt alloy, in the base of the package 36, for instance by means of a bolt 27. The four graded-index lenses 20 are located oriented and secured in their respective V-grooves 22 in the substrate 38 in the same manner as described above in relation to their counterparts in the V-grooves of the substrate 18 of the device of FIGS. 1 and 2.

Thus far in the channel drop and insertion device assembly process, the assembly steps closely parallel those previously described in respect of the assembly of the multiplexer/demultiplexer device of FIGS. 1 and 2. Subsequent steps diverge somewhat, principally because in each instance the input fibre, respectively fibre 10 and fibre 30, needs to be simultaneously coupled with more than one other fibre, and different considerations apply as to whether coupling should be fully optimised with the next fibre in the concatenation (i.e. respectively fibre 11 and fibre 31), or with the final fibre of the concatenation (i.e. respectively fibre 15 and fibre 33). To optimise the coupling between any particular pair of fibres, the end of each of the fibres concerned needs to be located at the specific distance from its associated graded-index lens 20 that produces a waist in the beam of light between the two lenses at the mid-point in the optical path between those two lenses. Accordingly, if there is fully optimised coupling between fibre 10 and any particular one of the fibres 11 to 15, the coupling between fibre 10 and any other one of the fibres 11 to 15 is inevitably sub-optimal because the optical path lengths are different, and therefore the waist in the light beam is not at the mid-point.

In the case of the channel drop and insertion device of FIG. 3, the preferred assembly method involves fully optimising the coupling between fibres 30 and 33. Minimisation of the optical losses in this path, sometimes known as the 'express path', is to be desired because this means that wavelengths that are neither dropped nor inserted by the device should ideally experience as low a loss as possible in their transit through the device.

In the case of the multiplexer/demultiplexer device of FIGS. 1 and 2, there can be advantage in similarly fully optimising the coupling between the two ends of the concatenation (i.e. fully optimising the coupling between fibres 10 and 15), but the earlier described preferred method of assembly has instead involved fully optimising the coupling between fibres 10 and 11 because this is easier to implement, and the extra loss involved in the sub-optimal coupling between fibres 10 and 15 is typically small enough to be acceptable.

Reverting attention to the method of assembly of the channel drop and insertion device of FIG. 3, the preferred assembly sequence is designed to minimise the express path loss by leaving the curing of the adhesive at the interface between the ferrule 21 of bare fibre 30*a* until such time as this ferrule and ferrule 21 of bare fibre 33*a* have been explored over the faces of their associated graded-index lenses 20 in order to achieve fully optimised coupling between these fibres. Initially however, the ferrules of a different pairing of bare fibres, namely bare fibres 30*a* and 31*a*, are explored in three dimensions over the faces of their associated graded-index lenses 20 in order to achieve fully optimised coupling between this different pair of fibres. The coupling between any pair of fibres is conveniently monitored during the optimisation process using visible light from a He—Ne laser. Determination of the optimum coupling can be impeded by extraneous multipath interference effects arising from Fresnel reflections at the glass/air interfaces where the end of each bare fibre is adjacent (but spaced from) its associated graded-index lens 20. In these circumstances, it may be preferred to reduce the magnitude of these reflections by applying adhesive between the ferrule and graded-index lens of either or both fibres being aligned, and to leave this adhesive in an uncured state at least for the duration of the alignment process.

Once the coupling between bare fibres 30a and 31a has been optimised, the uncured adhesive (if present) between the ferrule 21 of bare fibre 31a and its associated graded-index lens 20 may be cured. At this stage however, even if there is uncured adhesive between the ferrule 21 of bare fibre 30a and its associated graded-index lens 20, this adhesive should not be cured till later. Selective curing of this sort is conveniently accomplished using UV-curing adhesives, and using temporarily positioned screens (not shown) to prevent the UV light from reaching regions where curing is not to occur. Such screens may include 'mouse-holes' to permit the through passage of the light (typically visible light) used for alignment purposes so that these screens may be placed in position before the alignment process has been completed, rather than afterwards.

Primary filter $44_1$ is next placed in position. The procedure for aligning primary filter $44_1$ is not quite the same as that employed for aligning the corresponding primary filter $24_1$ of the wavelength multiplexer/demultiplexer of FIGS. 1 and 2. This is because there is no graded-index lens positioned to receive the light that has made only a single reflection in correctly oriented primary filter $44_1$. For this reason filter $44_1$ is initially oriented so that the light making a single reflection in filter $44_1$ is instead directed at the end of the graded-index lens to which the end of fibre 32 will ultimately be secured. The filter is rotated about an axis lying in a plane parallel to the plane of the platform 43 so as to optimise the height of the position at which reflected beam is incident upon lens 20 of fibre 32. This height is indicated by the height of the spot of light that the lens form on the inside end wall of the package 36. Once the height is correct, the filter $44_1$ is rotated about an axis perpendicular to the plane of the platform 43 to bring its transmission waveband into registry with channel waveband $\lambda_m$. Following the same procedure as for filter $24_1$, when the required position for filter $44_1$ has been determined, it is removed in a controlled manner from proximity with the surface of platform 43, adhesive is applied, and then it is replaced as precisely as possible in its former position, and the adhesive is cured. If the adhesive for securing the bare fibres 30a to 33a and their ferrules 21 to their associated graded-index lenses 20 is a UV-curing adhesive, a UV-curing adhesive will typically also be used for securing the filters $44_1$, $44_2$ and 45 and steering blocks $46_1$ and $46_2$ to the platform 43 of the substrate 38. Low shrinkage is a particularly important criterion for the adhesive securing the fibres, while a high glass transition temperature (for minimising creep) is a particularly important criterion for the adhesive securing the filters, and so the adhesive best suited for securing the fibres is not necessarily the one best suited for securing the filters.

With the filter $44_1$ secured in position, it is now possible to compensate for any coupling loss between the ends of bare fibres 30a and 31a arising from lack of parallelism of the faces of filter $44_1$. If bare fibre 31a is not yet secured with adhesive, then the positions of both may be adjusted in this corrective alignment procedure, otherwise this procedure will involve realignment only of bare fibre 30a. After the realignment, if it has not already been cured previously, the adhesive between the end of the ferrule 21 of bare fibre 31a and its graded-index lens 20 is cured.

Next, output fibre 33 is inserted into the package 36, and also the filter $44_2$, preparatory for fully optimising the optical coupling between the ends of bare fibres 30a and 33a. It is preferred for the gaps between the ends of bare fibres 30a and 33a and their associated graded-index lenses 20 filled with uncured adhesive whilst this optimisation is being carried out. In this instance, though the end of bare fibre 33a is explored in three dimensions over the face of its associated graded-index lens termination 20, the corresponding exploration of the end of bare fibre 30a is limited solely to movement in the axial direction of its associated graded-index lens termination 20. In this manner the consequent degradation of the coupling between the ends of bare fibres 30a and 31a is minimised in a way that would not be the case if movement of the end of bare fibre 30a were permitted in any direction at right-angles to the axial direction. During the optimisation of the coupling between the ends of bare fibres 30a and 33a, the output from fibre 31 is constantly monitored. Accordingly, the process essentially allows full optimisation of coupling for the express path, albeit whilst compromising, at least to a limited extent, the coupling to the dropped path due to variation in the gap between fibre end and lens for bare fibre 30a; the degradation for the coupling to the dropped path, however, is acceptably small. On completion of the express path optimisation, the uncured adhesive between the ferrule 21 of fibre 30a and its associated graded-index lens 21 is cured and the dropped path optical characteristics are then determined, unless the design calls for the subsequent deployment of a post filter 45 and a steering block $46_1$.

The next stage of the assembly process involves orientation of filter $44_2$, which is already in the package but not secured to it, and the positioning of the end of bare fibre 33a in relation to its associated graded-index lens 20 in order to optimise coupling into bare fibre 33a whilst at the same time obtaining the correct spectral transmission function through the device from fibre 30 to fibre 33. This transmission function will show the narrowest and deepest stop-band (i.e. missing intensity) centred on the required drop and insertion wavelength $\lambda_m$ when both filters $44_1$ are $44_2$ operating at the appropriate angle of incidence for transmission at a centre wavelength of $\lambda_m$. Filter $44_1$ is already operating at the correct angle of incidence since it is dropping at a centre wavelength of $\lambda_m$, so if the stop-band characteristics are fully enhanced and the coupled intensity from fibre 30 to fibre 33 for wavelengths on either side of the stop band is maximised, it must be true that filter $44_2$ is also then operating at the correct angle of incidence, and the express path loss is at its minimum. It should be noted that for optimisation of the stop-band characteristic, all four points at which reflections occur from the filters should be well matched in terms of centre wavelengths for the transmission curve. In practice this means that, although absolute accuracy in filter centre wavelength is not paramount, well matched filters are needed. In this context it may also be noted that a small change in the orientation of filter $44_2$ to angle tune its transmission can be arranged to be accomplished with minimal change of optical path length between the inboard ends of graded-index lenses 20 of bare fibres 30a and 33a. Such a change of orientation will, of course, change the angle at which the light emerging from the end of bare fibre 30a is incident upon the graded-index lens 20 associated with bare fibre 33a, but the consequent reduction in the efficiency of coupling this light into bare fibre 33a can be restored by exploring the end of that bare fibre over the end of its graded-index lens. At this point filter $44_2$ is removed in a controlled manner from proximity with the surface of platform 43, adhesive is applied, and then it is replaced as precisely as possible in the former position, and the adhesive is cured. The securing of the filter $44_2$ with adhesive may have introduced a slight misalignment of that filter, thereby affecting the coupling between fibres 30 and 33. A check is therefore made to see if this has occurred. If so, this is compensated by realignment of the end of fibre 33a and its graded-index lens 20, and then the adhesive between these two components is cured.

Fibre 32 is now introduced into the package 36, preparatory for optimising the optical coupling between the ends of bare fibres 32a and 33a by the exploring of the end of bare fibre 32a in three dimensions over the face of its associated graded-index lens 20. Under these conditions the light from fibre 32 will be incident upon the graded-index lens 20 of bare fibre 33a at substantially the same angle of incidence as light from fibre 30. Accordingly the light from fibre 32 emerges from filter $44_2$ at substantially the same angle as light from fibre 30, the former being transmitted by the filter while the latter has been reflected by it. The filter has been specifically angled so that for light from fibre 30 reflectivity at $\lambda_m$ is at a minimum. Therefore, for light from fibre 32, it must be angled so that its transmissivity at $\lambda_m$ is at a maximum. The adhesive between the end of fibre 32a and its graded-index lens 20 is then cured. The light from fibre 32 is incident upon the graded-index lens 20 of bare fibre 33a at substantially the same angle of incidence as light from fibre 30, but not necessarily without a lateral offset between their points of incidence. The final coupling of the inserted light is therefore maximised by insertion, manipulation and securing with adhesive, of a steering block $46_2$ to eliminate any such lateral offset.

Aspects of the method of assembly of channel drop and insertion device described above with reference to FIG. 3 that concern the full optimisation of the express path can be incorporated back into the assembly method described earlier in respect of the multiplexer/demultiplexer device of FIGS. 1 and 2 in order to provide full optimisation of the coupling between the two ends of its concatenation (i.e. full optimisation of the coupling between fibres 10 and 15) instead of between its fibres 10 and 11. For this purpose it is not necessary to use the primary filters themselves (filters 24) for the setting up of the optimised coupling between the ends of the concatenation as this can more conveniently be set up using a special purpose reflection block (not shown) inserted temporarily in place of those filters, this reflection block being constructed to provide a folded optical path of length corresponding to that later to be provided by those primary filters.

It will be appreciated that just as it is possible, in the case of the multiplexer/demultiplexer assembly, to employ a special purpose reflection block for the initial setting up of the optimised coupling between the ends of the concatenation, so it is also possible, in the case of the drop and insertion device assembly, to employ a similar special block for the initial setting up of the optimised coupling between the ends of the express path.

Figure 4:
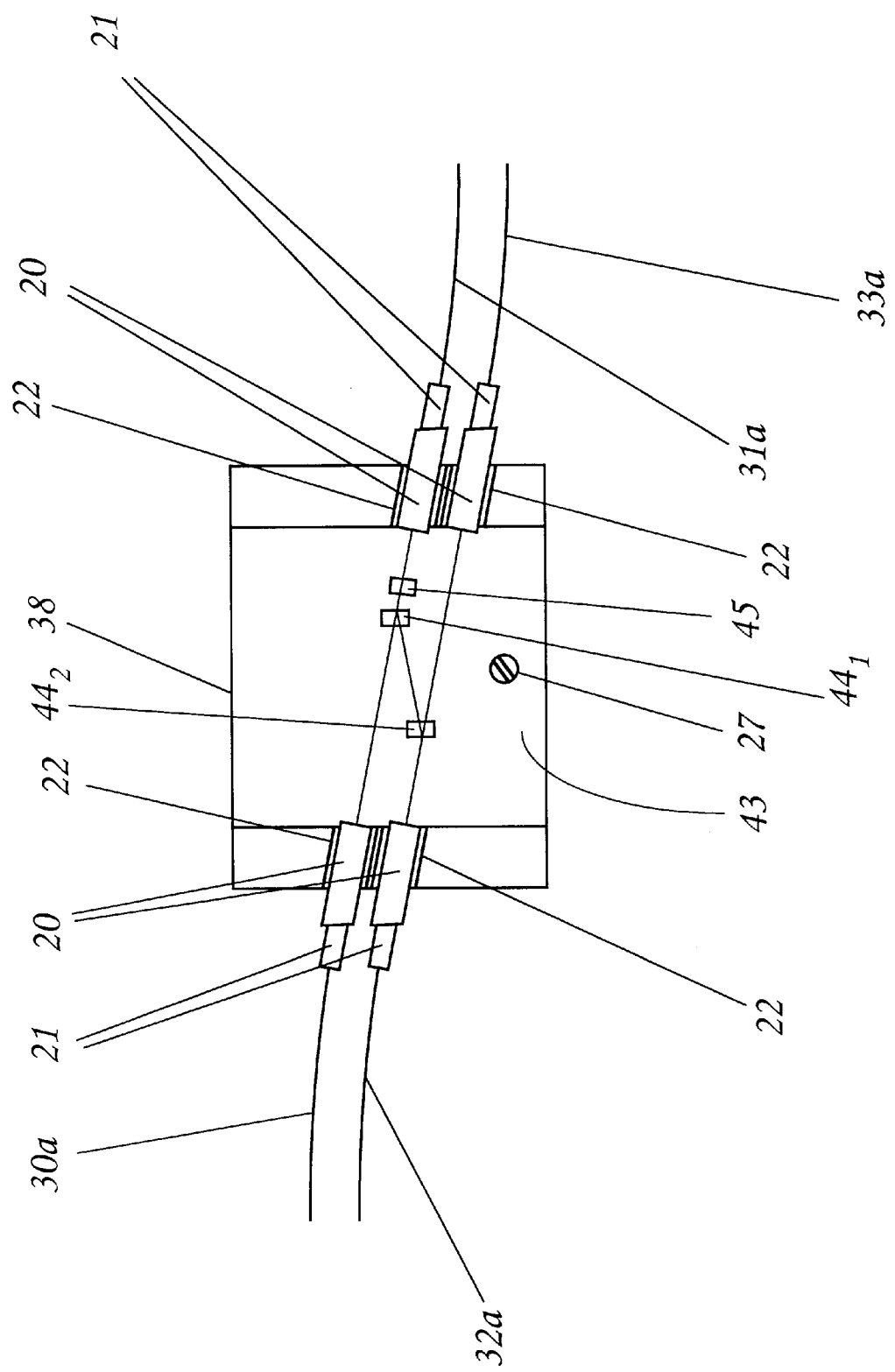
FIG. 4 depicts the central portion of a variant of the channel drop and insertion filter device of FIG. 3.

One of the particular features of the channel drop and insertion device of FIG. 3 is the high level of isolation that is obtained between the inserted and dropped channels by virtue of the fact that the express path involves four reflections, comprising two in primary filter $44_1$ and two in primary filter $44_2$. If a given crosstalk specification is not too onerous, then the device may be constructed using the same package structure and a closely analogous assembly technique, but with a single reflection in each of the primary filters $44_1$ and $44_2$. Such a channel drop and insertion device, the central portion of which is depicted in FIG. 4, will be termed a 'two reflection' channel drop and insertion device in order to draw a contrast between it and the 'four reflection' channel drop and insertion device of FIG. 3. The filters of the two reflection device do not need to be as wide as those of the four reflection device. The angle of incidence upon the primary filters may be made greater in order to maintain a given physical separation between lenses on either side of the device. One further relaxation that occurs concerns the fact that in the four reflection device the two primary filters should be well matched in filter characteristic which should be uniform over the whole area of each filter, whereas in a two reflection device the filter centre wavelengths do not necessarily have to be particularly closely matched with each other because both can be independently angle tuned.

Figure 5:
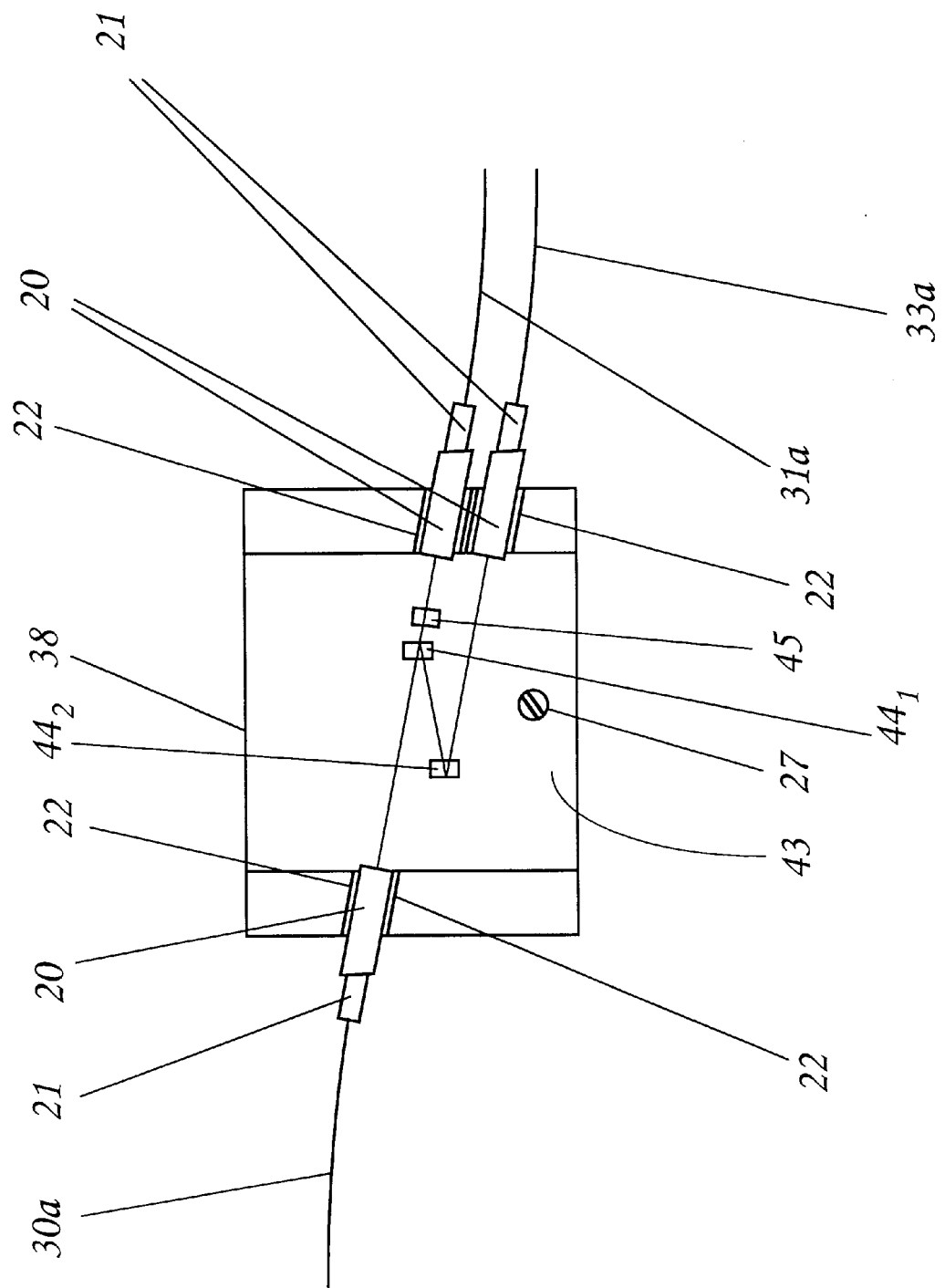
FIG. 5 depicts the central portion of a modification of the device of FIG. 4, two such devices being capable of being coupled together to form a two-package equivalent of the channel drop and insertion filter device of FIG. 3.

The two reflection device of FIG. 4, which is a 4-port device package, can be modified by the omission of the fibre 32, its graded-index lens 22, its ferrule termination 21 and its hermetic feed-through 17, to produce a 3-port device package the central portion of which is depicted in FIG. 5. Two of these 3-port device packages may be connected together by optically coupling their respective fibres 33 to form a two-package four-reflection channel drop and insertion device having similar optical properties to those of the channel drop and insertion device of FIG. 3.

What is claimed is:

1. A method of making an optical filter network, the network having, mounted on a substrate, a set of dielectric filters optically coupled with a set of graded-index lens terminated optical fibres via their graded-index lens terminations so as to provide a network of optical couplings between said fibres, wherein each of said graded-index lens terminations is secured in a preferred orientational alignment with respect to the substrate by being secured in line contact with an associated surface feature of said substrate and each of said dielectric filters is secured in an optimised position and orientation determined by translational and rotational manipulation of each respective filter until the filter is aligned relative to the terminations according to a number of predetermined criteria.

2. A method of making an optical filter network as claimed in claim 1, wherein said associated surface features of the substrate are V-grooves.

3. A method of making an optical channel drop and insertion network as claimed in claim 1, wherein each dielectric filter is formed on an associated die, and said dice are individually directly secured to a common planar surface region of the substrate.

4. A method of making an optical filter network as claimed in claim 1, wherein said network is an optical wavelength multiplexing network.

5. A method of making an optical filter network as claimed in claim 1, wherein said network is an optical wavelength demultiplexing network.

6. A method of making an optical filter network as claimed in claim 1, wherein said network is an optical channel drop and insertion network.

7. A method of making an optical channel drop and insertion network as claimed in claim 6, wherein the number of said dielectric filters is two, and the number of said graded-index lens terminated optical fibres is four, respectively constituting a common input fibre, a channel drop fibre, a channel insertion fibre, and a common output fibre, wherein the dielectric filters and graded-index lens terminated fibres are relatively disposed such that, the common input fibre is optically coupled with the channel drop fibre by non-normal incidence transmission once through one of the two dielectric filters, the common input fibre is optically coupled with the common output fibre by non-normal incidence reflection twice in each of the two dielectric filters, and the channel insertion fibre is optically coupled with the common output fibre by non-normal transmission once through the other one of the two dielectric filters.

8. A method of making an optical channel drop and insertion network as claimed in claim 7, wherein both dielectric filters are formed on associated dice, and said dice are individually directly secured to a common planar surface region of the substrate.

9. A method of making an optical filter network as claimed in claim 1, wherein said network is an n-way optical wavelength multiplexing network, wherein the number of said dielectric filters is (n−1), numbered 1 to (n−1), and the number of graded-index lens terminated optical fibres is (n+1), of which one fibre is an output fibre optically coupled with the other n fibres, which are input fibres, numbered 1 to n, and wherein the dielectric filters and lens terminated fibres are relatively disposed such that input fibre numbered 1 is optically coupled with the output fibre by non-normal incidence transmission through dielectric filter numbered 1, input fibre numbered n is optically coupled with output fibre by non-normal incidence reflection in each of the dielectric filters, and each input fibre numbered r, where 1<r<n, is optically coupled with the output fibre by non-normal incidence transmission through the dielectric filter numbered r and non-normal incidence reflection in each of the filters numbered 1 to (r−1).

10. A method of making an optical filter network as claimed in claim 9 wherein each dielectric filter is formed on an associated die, and said dice are individually directly secured to a common planar surface region of the substrate.

11. A method of making an optical filter network as claimed in claim 1, wherein the set of dielectric filters consists of a first dielectric filter and a second dielectric filter, and wherein the set of graded-index lens terminated optical fibres consists of a first graded-index lens terminated optical fibre optically coupled with a second graded-index lens terminated optical fibre via transmission through said first dielectric filter, and of a third graded-index lens terminated optical fibre optically coupled with said first graded-index lens terminated optical fibre via a reflection in both of said dielectric filters.

12. A method of making an optical filter network as claimed in claim 11, wherein both dielectric filters are formed on associated dice, and said dice are individually directly secured to a common planar surface region of the substrate.

13. A method of making an optical channel drop and insertion network comprising first and second optical filter networks as claimed in claim 11 optically coupled via their respective third graded-index lens terminated optical fibres.

14. A method of making an n-way optical multiplexer having, mounted on a substrate, a graded-index lens terminated output optical fibre optically coupled with each of a set of n graded-index lens terminated optical fibres, numbered 1 to n, via oblique incidence upon a set of (n−1) dielectric filters, numbered 1 to (n−1), wherein input fibre numbered 1 is optically coupled with the output fibre by non-normal incidence transmission through dielectric filter numbered 1, wherein input fibre numbered n is optically coupled with output fibre by non-normal incidence reflection in each of the dielectric filters, and wherein each input fibre numbered r, where 1<r<n, is optically coupled with the output fibre by non-normal incidence transmission through the dielectric filter numbered r and non-normal incidence reflection in each of the filters numbered 1 to (r−1), in which method, in respect of each of the output and n input fibres, the respective graded-index lens is secured in a preferred orientational alignment with respect to the substrate by being secured in contact with an associated surface feature of said substrate before the output and n input fibres are secured to their respective graded-index lenses, and before the dielectric filters are secured to the substrate, and each of said dielectric filters is secured in an optimised position and orientation determined by translational and rotational manipulation of each respective filter until the filter is aligned relative to the terminations according to a number of predetermined criteria.

15. A method of making an optical channel drop and insertion network having, mounted on a substrate four graded-index lens terminated optical fibres, respectively a common input fibre, a channel drop fibre, a channel insertion fibre, and a common output fibre, said fibres being optically coupled via first and second dielectric filters, wherein the dielectric filters and lens terminated fibres are relatively disposed such that, the common input fibre is optically coupled with the channel drop fibre by non-normal incidence transmission once through said first dielectric filter, the common input fibre is optically coupled with the common output fibre by non-normal incidence reflection twice in each of the two dielectric filters, and the channel insertion fibre is optically coupled with the common output fibre by non-normal transmission once through said second dielectric filter, in which method, in respect of each of said four fibres, the respective graded-index lens is secured in a preferred orientational alignment with respect to the substrate by being secured in contact with an associated surface feature of said substrate before said fibres are secured to their respective graded-index lenses, and before the dielectric filters are secured to the substrate, and each of said dielectric filters is secured in an optimised position and orientation determined by translational and rotational manipulation of each respective filter until the filter is aligned relative to the terminations according to a number of predetermined criteria.

16. A method of making an optical filter network having, mounted on a substrate a first graded-index lens terminated optical fibre optically coupled with a second graded-index lens terminated optical fibre via transmission through a first dielectric filter, and of a third graded-index lens terminated optical fibre optically coupled with said first graded-index lens terminated optical fibre via a reflection in both of said first dielectric filter and a second dielectric filter, in which method, in respect of each of said three fibres, the respective graded-index lens is secured in a preferred orientational alignment with respect to the substrate by being secured in contact with an associated surface feature of said substrate before said fibres are secured to their respective graded-index lenses, and before the dielectric filters are secured to the substrate, and each of said dielectric filters is secured in an optimised position and orientation determined by translational and rotational manipulation of each respective filter until the filter is aligned relative to the terminations according to a number of predetermined criteria.

* * * * *